UNITED STATES PATENT OFFICE 2,544,638

COPOLYMERS OF ACRYLONITRILE AND N-ALLYL AND N-2-METHALLYL UREAS

John R. Caldwell, Kingsport, Tenn., assignor to Eastman Kodak Company, Rochester, N. Y., a corporation of New Jersey No Drawing. Application December 28, 1949, Serial No. 135,532

12 Claims. (Cl. 260—77.5)

This invention relates to copolymers of acrylonitrile with N-allyl ureas and with N-2-methallyl ureas.

It is known that acrylonitrile homopolymerizes to a high molecular weight resinous compound which is characterized by poor solubility, excessive brittleness, and very high softening point making difficult the shaping of materials therefrom, as in compression and injection molding processes and as in extrusion processes wherein the resin molecules are oriented so as to be parallel with the major surface, for example, in the production of filaments, fibers, yarns, etc. The filaments produced from polyacrylonitrile tend to be porous, spongy, weak, or brittle, or have a discontinuous structure. On the other hand, N-allyl and N-2-methallyl ureas cannot be homopolymerized to high molecular weight resinous polymers by the usual polymerization catalysts.

I have now found, however, that N-alkenyl ureas, i. e., N-allyl and N-2-methallyl ureas which can be represented by the following general formula:

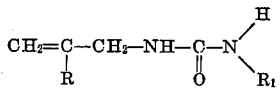

wherein R represents an atom of hydrogen or a methyl group, and $R_1$ represents an atom of hydrogen, an alkyl group containing from 1 to 4 carbon atoms (e. g., methyl, ethyl, propyl, isopropyl, butyl, etc., groups) or an aryl group of the benzene series containing from 6 to 8 carbon atoms (e. g., phenyl, tolyl, or xylyl groups), i. e., substituted ureas such as N-allyl urea, N-allyl-N'-methyl urea, N-allyl-N'-ethyl urea, N-allyl-N'-propyl urea, N-allyl-N'-butyl urea, N-allyl-N'-phenyl urea, N-allyl-N'-p-tolyl urea, N-2-methallyl urea, N-2-methallyl-N'-methyl urea, N-2-methallyl-N'-ethyl urea, N-2-methallyl-N'-propyl urea, N-2-methallyl-N'-butyl urea, N-2-methallyl-N'-phenyl urea, N-2-methallyl-N'-p-tolyl urea, etc., can be polymerized with acrylonitrile in certain proportions to give high molecular weight resinous copolymers that are soluble in one or more volatile solvents and that can be fashioned by conventional methods into flexible, continuous structure filaments of good strength, into flexible and tough sheet materials, and into tough molded objects.

It is, accordingly, an object of my invention to provide a new class of resinous copolymers. A further object is to provide a new resinous copolymer from which high quality yarns can be made. A further object is to provide a new resinous copolymer from which high quality sheet materials and molded objects can be made. A further object is to provide a process for preparing such copolymers. Other objects will become apparent hereinafter.

In accordance with the invention, I prepare the new copolymers by polymerizing a mixture of monomeric acrylonitrile and one or more of the mentioned monomeric N-allyl or N-2-methallyl ureas. The polymerization is advantageously carried out in the presence of a polymerization catalyst. Peroxide polymerization catalysts which are soluble in the mixture of monomers can be employed, e. g., organic peroxides such as benzoyl peroxide, acetyl peroxide, lauroyl peroxide, tertiary butyl hydroperoxide, etc. Water-soluble peroxides can also be used, e. g., hydrogen peroxide, ammonium persulfate, potassium persulfate, sodium persulfate, persulfuric acid, the water-soluble salts of percarbonic acid, the water-soluble salts of perphosphoric acid, the water-soluble salts of sulfo-per-acid (Caro's acid). As water-soluble salts, the ammonium, potassium, and sodium salts are especially suitable. Mixtures of the catalysts can be employed.

The polymerizations can be carried out in bulk (mass), in solvents or in heterogeneous dispersion where the mixture of monomers is dispersed in a non-solvent for the monomers, the particles of dispersed monomers being very small (emulsion) or relatively large (bead or granular). In bulk or mass polymerization the organic peroxide catalysts are advantageously employed. In solvent polymerization, the organic catalysts are also advantageously employed. Suitable solvents include water, acetone, methyl ethyl ketone, methanol, ethanol, propanol, isopropanol, tertiary butyl alcohol, 1,4-dioxane, chloroform, carbon tetrachloride, naphtha (liquid saturated aliphatic hydrocarbons boiling from 60 to 100° C.), benzene etc.

For emulsion polymerization, any non-solvent for either the monomers or for the resulting copolymer can be employed, water being especially advantageous. The mixture of monomers can be advantageously dissolved in the water and emulsifying agents added, the insoluble copolymer being obtained in emulsion suspension as it forms. Suitable emulsifying agents are compounds such as salts of higher fatty acids, e. g., sodium or potassium stearate, palmitate, etc., or ordinary soaps, salts of higher fatty alcohol sulfates, e. g., sodium or potassium lauryl sulfate, sodium or potassium di(2-ethylhexyl) sulphosuccinate, sodium or potassium dihexyl sulphosuccinate, sodium or potassium cetyl sulfate, sodium or potassium stearyl sulfate, etc., salts of aromatic sulfonic acids, e. g., sodium or potassium salts of alkylnaphthalene sulfonic acids, etc., higher molecular weight quaternary ammonium salts, e. g., dimethyl benzylphenyl ammonium chloride, quaternary ammonium salts containing the radical $C_{15}H_{31}$ and $C_{17}H_{35}$, etc. Mixtures of emulsifying agents can be employed. For bead or granular polymerization relatively poor dispersing agents such as starch, methylated starch, gum arabic, polyvinyl alcohol, partly hydrolyzed polyvinyl acetate, gelatin, sodium cellulose glycolate, etc., can be employed. Mixtures of dispersing agents can be employed. In the polymerizations wherein the mixture of monomers is dispersed in a non-solvent, or where the copolymers formed are insoluble in the polymerization mixture, the dispersion of the mixture of monomers or of the copolymer can be facilitated by stirring, shaking, or tumbling of the polymerization mixtures. In emulsion polymerization, the water-soluble polymerization catalysts are advantageously employed.

Heat accelerates all the polymerizations, a temperature range of 40° to 70° C. for a period of from 2 to 24 hours being advantageous. However, temperatures up to 100 to 110° C. can be employed, if desired. The amount of polymerization catalyst employed can vary within wide limits, but preferably in the range of 0.1 to 5 per cent by weight of the total monomers. Where the polymerization is carried out in a solvent, the concentration of the monomers can vary from 2 to 50 parts by weight of the monomers to from 98 to 50 parts by weight of solvent, but the best operating efficiency is obtained with a concentration of about 10 parts by weight of the monomers to 90 parts by weight of the solvent. The copolymers of the invention advantageously contain not less than 2 per cent and not more than 40 per cent by weight of the mentioned N-allyl or N-2-methallyl ureas, the remainder of the copolymer being acrylonitrile, but the most useful copolymers contain from 5 to 35 per cent by weight of the mentioned N-allyl or N-2-methallyl ureas and from 95 to 65 per cent by weight of acrylonitrile. The proportion of the mentioned N-allyl or N-2-methallyl ureas employed in the monomeric mixture has been found to be substantially the same in the polymeric material made from such mixture in accordance with my invention.

The following examples will serve to illustrate further the manner of obtaining my new copolymers.

*Example 1*

75 g. of acrylonitrile, 25 g. of N-allyl-N'-phenyl urea, 3 g. of a fatty alcohol sulfate (e. g. sodium lauryl sulfate), 1.2 g. of sodium persulfate and 400 cc. of water were mixed together and stirred at 60° C. for a period of 6 hours. The emulsion polymer which formed was coagulated with sodium sulfate. The resin precipitate was filtered off, washed and dried. A yield of 80–85 per cent by weight of resinous polymer was obtained which contained 78 per cent by weight of combined acrylonitrile, the remainder of the polymer being combined N-allyl-N'-phenyl urea. It had a softening point above 180° C. and was soluble in dimethyl formamide, dimethyl acetamide, and gamma-butyrolactone. The resins are useful as molding plastics and for the production of fibers.

A polymer having generally similar properties was obtained by replacing the N-allyl-N'-phenyl urea in the above example with a like amount of N-2-methallyl-N'-phenyl urea. It contained substantially the same percentages of combined acrylonitrile and combined N-2-methallyl-N'-phenyl urea as the polymer of the above example.

*Example 2*

75 g. of acrylonitrile, 25 g. of N-allyl urea, 3 g. of a fatty alcohol sulfate (e. g. sodium lauryl sulfate), 1.2 g. of sodium persulfate and 400 cc. of water were mixed together and stirred at 60° C. for a period of 6 hours. The emulsion polymer which formed was coagulated with sodium sulfate, the precipitated resin filtered off, washed with water, and dried. A yield of over 80 per cent of theory of copolymer was obtained. It contained substantially 75 per cent by weight of combined acrylonitrile, the remainder of the polymer being combined N-allyl urea. The polymer had a softening point above 230° C. and was soluble in dimethyl acetamide, gamma-butyrolactone, and ethylene carbonate. This resin is particularly useful in the manufacture of synthetic fibers because of its high melting point.

*Example 3*

85 g. of acrylonitrile, 15 g. of N-allyl-N'-methyl urea, 4 g. of sulfonated mineral oil, 1.3 g. of potassium persulfate and 700 cc. of water were mixed together and stirred at 65 to 70° C. for 10 hours. The emulsion obtained was coagulated with sodium sulfate to give a yield of resinous polymer containing substantially 85 per cent by weight of combined acrylonitrile, the remainder being combined N-allyl-N'-methyl urea. The polymer had a softening point above 240° C. and was soluble in dimethyl acetamide, gamma-butyrolactone, and ethylene carbonate. This resin is particularly useful in the manufacture of synthetic fibers because if its high melting point.

By substituting for the N-allyl-N'-methyl urea in the above example a like amount of N-2-methallyl-N'-methyl urea, there is produced a polymer having about the same acrylonitrile content and generally similar properies.

*Example 4*

85 g. of acrylonitrile, 15 g. of N-allyl-N'-ethyl urea, 4 g. of sulfonated mineral oil, 1.3 g. of potassium persulfate and 700 cc. of water were mixed together and stirred at 65 to 70° C. for 10 hours. The emulsion polymer obtained was coagulated by adding sodium sulfate thereto. The precipitated resinous polymer was separated, washed with water, and dried. It contained 85 per cent by weight of combined acrylonitrile and 15 per cent by weight of combined N-allyl-N'-ethyl urea. The polymer had a softening point above 220° C. and was soluble in dimethyl acetamide, dimethyl formamide, and gamma-butyrolactone.

In place of the N-allyl-N'-ethyl urea, there can be substituted in the above example a like amount of N-2-methallyl-N'-ethyl urea to give a resinous polymer of similar percentages of acrylonitrile and N-2-methallyl-N'-ethyl urea and having generally similar properties.

The monomeric N-allyl and N-2-methallyl ureas employed in my invention can be readily prepared by reacting allyl or 2-methallyl amine with an isocyanate as shown in the equation:

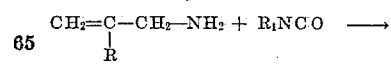

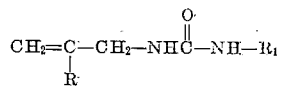

wherein R is an atom of hydrogen or a methyl group and R₁ is an alkyl group containing from 1 to 4 carbon atoms or an aryl group of the benzene series containing from 6 to 8 carbon atoms. The N-allyl and N-2-methallyl urea product can then be isolated from the reaction mixture by conventional methods. The monomeric ureas employed in my invention can also be made by treating N-allyl or N-2-methallyl amine with alkyl or aryl carbamide chlorides as shown by the equation:

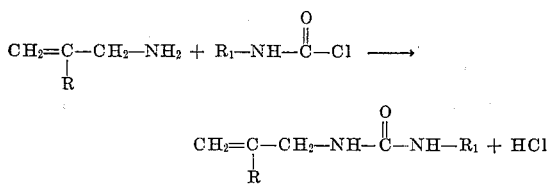

wherein R and $R_1$ have the same previously defined meanings.

Proceeding as shown in the foregoing examples, other copolymers can be prepared, for example, from monomeric mixtures containing 2 per cent by weight of one or more of the mentioned N-allyl or N-2-methallyl ureas, 5 per cent by weight of one or more of the mentioned N-allyl or N-2-methallyl ureas, 10 per cent by weight of one or more of the mentioned N-allyl or N-2-methallyl ureas, 20 per cent by weight of one or more of the mentioned N-allyl or N-2-methallyl ureas, 30 per cent by weight of one or more of the mentioned N-allyl or N-2-methallyl ureas, 35 per cent by weight or one or more of the metnioned N-allyl or N-2-methallyl ureas and 40 per cent by weight of one or more of the mentioned N-allyl or N-2-methallyl ureas, the remainder being acrylonitrile in each case.

The copolymers of the invention containing from 5 to 35 per cent by weight of the mentioned N-allyl or N-2-methallyl ureas are soluble in one or more volatile solvents such as succino-nitrile, dimethyl formamide, dimethyl acetamide, or in mixtures of these solvents or mixtures with aceto-nitrile, for example, in 2 parts of acetonitrile and 1 part of dimethyl formamide. From viscous dopes in the above solvents, the copolymers can be extruded through a spinneret into a cabinet or cell where the solvent is evaporated to give monofilaments which can be spun to yarn. Such viscous dopes can also be coated on a film-forming surface of metal or glass and the resulting film stripped from the film-forming surface. The copolymers can also be molded with or without plasticizers, fillers, coloring matter, etc., by means of extrusion, injection, or compression methods into shaped objects which can be worked into finished form by heat and mechanical means.

What I claim is:

1. A copolymer of from 60 to 98 per cent by weight of acrylonitrile and from 40 to 2 per cent by weight of an N-alkenyl urea having the general formula:

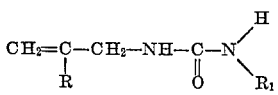

wherein R represents a member selected from the group consisting of an atom of hydrogen and a methyl group, and $R_1$ represents a member selected from the group consisting of an atom of hydrogen, an alkyl group containing from 1 to 4 carbon atoms, and an aryl group of the benzene series containing from 6 to 8 carbon atoms.

2. A copolymer of 78 per cent by weight of acrylonitrile and 22 per cent by weight of N-allyl-N'-phenyl urea.

3. A copolymer of 85 per cent by weight of acrylonitrile and 15 per cent by weight of N-allyl-N'-methyl urea.

4. A copolymer of 75 per cent by weight of acrylonitrile and 25 per cent by weight of N-allyl urea.

5. A process for preparing a copolymer of acrylonitrile and an N-alkenyl urea comprising heating a mixture containing from 60 to 98 parts by weight of acrylonitrile and from 40 to 2 parts by weight of an N-alkenyl urea having the general formula:

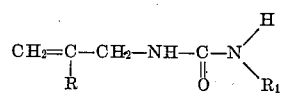

wherein R represents a member selected from the group consisting of an atom of hydrogen and a methyl group, and $R_1$ represents a member selected from the group consisting of an atom of hydrogen, an alkyl group containing from 1 to 4 carbon atoms, and an aryl group of the benzene series containing from 6 to 8 carbon atoms, in the presence of a peroxide polymerization catalyst.

6. A process for preparing a copolymer of acrylonitrile and N-allyl-N'-phenyl urea comprising heating a mixture containing 75 parts by weight of acrylonitrile and 25 parts by weight of N-allyl-N'-phenyl urea, in the presence of sodium persulfate and water.

7. A process for preparing a copolymer of acrylonitrile and N-allyl-N'-methyl urea comprising heating a mixture containing 85 parts by weight of acrylonitrile and 15 parts by weight of N-allyl-N'-methyl urea, in the presence of potassium persulfate and water.

8. A process for preparing a copolymer of acrylonitrile N-allyl urea comprising heating a mixture containing 75 parts by weight of acrylonitrile and 25 parts by weight of N-allyl urea in the presence of sodium persulfate and water.

9. A copolymer of 85 per cent by weight of acrylonitrile and 15 percent by weight of N-allyl-N'-ethyl urea.

10. A copolymer of 78 percent by weight of acrylonitrile and 22 percent by weight of N-methallyl-N'-phenyl urea.

11. A process for preparing a copolymer of acrylonitrile and N-allyl-N'-ethyl urea comprising heating a mixture containing 85 parts by weight of acrylonitrile and 15 parts by weight of N-allyl-N'-ethyl urea, in the presence of potassium persulfate and water.

12. A process for preparing a copolymer of acrylonitrile and N-methallyl-N'-phenyl urea comprising heating a mixture containing 75 parts by weight of acrylonitrile and 25 parts by weight of N-methallyl-N'-phenyl urea, in the presence of potassium persulfate and water.

JOHN R. CALDWELL.

REFERENCES CITED

The following references are of record in the file of this patent:

UNITED STATES PATENTS

| Number | Name | Date |
|---|---|---|
| 2,318,959 | Muskat et al. | May 11, 1943 |